(12) United States Patent
Hsiao et al.

(10) Patent No.: US 6,948,231 B2
(45) Date of Patent: Sep. 27, 2005

(54) METHOD OF DEPOSITING MATERIAL INTO HIGH ASPECT RATIO FEATURES

(75) Inventors: Richard Hsiao, San Jose, CA (US); Quang Le, San Jose, CA (US); Paul P. Nguyen, San Jose, CA (US); Son Van Nguyen, Los Gatos, CA (US); Mustafa Pinarbasi, Morgan Hill, CA (US); Patrick R. Webb, San Jose, CA (US); Howard G. Zolla, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 10/153,333

(22) Filed: May 21, 2002

(65) Prior Publication Data

US 2003/0218835 A1 Nov. 27, 2003

(51) Int. Cl.[7] .......................... G11B 5/127; H04R 31/00
(52) U.S. Cl. .................. 29/603.25; 29/603.13; 29/603.14; 29/606; 216/62; 216/65; 216/66; 360/122; 360/126; 360/317; 427/127; 427/128; 451/5; 451/41
(58) Field of Search ............... 29/603.13, 603.14, 29/603.25, 606; 216/62, 65, 66; 360/122, 126, 127, 317; 427/127, 128; 451/5, 41

(56) References Cited

U.S. PATENT DOCUMENTS

| | | | |
|---|---|---|---|
| 4,933,209 A | * | 6/1990 | Anthony et al. ............ 427/116 |
| 5,178,739 A | | 1/1993 | Barnes et al. |
| 5,566,442 A | * | 10/1996 | Gaud et al. ............... 29/603.14 |
| 5,871,622 A | | 2/1999 | Pinarbasi |
| 5,936,813 A | | 8/1999 | Kim et al. |
| 5,962,923 A | | 10/1999 | Xu et al. |
| 6,086,727 A | | 7/2000 | Pinarbasi |
| 6,105,238 A | | 8/2000 | Chesnutt et al. |
| 6,136,707 A | | 10/2000 | Cohen |
| 6,452,742 B1 | * | 9/2002 | Crue et al. .................... 360/126 |
| 6,500,762 B2 | * | 12/2002 | Hashim et al. ............. 438/687 |
| 6,758,947 B2 | * | 7/2004 | Chiang et al. .......... 204/192.12 |

FOREIGN PATENT DOCUMENTS

JP       2000323568 A   * 11/2000       H01L/21/768

OTHER PUBLICATIONS

"Time domain network analysis of write head coil impedance"; Dakroub, H.; Magnetics, IEEE Transactions on , vol.: 37 , Issue: 2 , Mar. 2001; pp.: 1049–1051.*

Broadbent et al., "Experimental and Analytical Study of Seed Layer Resistance for Copper Damascene Electroplating," J. Vac. Sci. Technol. B 17(6) Nov./Dec. 1999, pp. 2584–2595.

* cited by examiner

Primary Examiner—Paul D. Kim
(74) Attorney, Agent, or Firm—Crawford Maunu PLLC

(57) ABSTRACT

The present invention presents a method for fabricating coil elements for magnetic write heads. A coil pattern is formed on a substrate using photolithographic techniques. The substrate is etched using reactive ion etching, creating a coil-shaped trench in the substrate. Thin film seed layers are deposited using ion beam deposition. The substrate is electroplated with metal filling the trenches with metal. The substrate is chemical mechanical polished to remove excess metal and planarize the air bearing surface of the write head.

9 Claims, 7 Drawing Sheets

METHOD OF DEPOSITING MATERIAL INTO HIGH ASPECT RATIO FEATURES

BACKGROUND OF THE INVENTION

1. Field of the Invention

This invention relates in general to manufacture of magnetic recording heads, and more particularly to a method of depositing material into high aspect ratio.

2. Description of Related Art

People need access to an increasing amount of information in our technologically advancing society. Data storage using magnetic disk drives is well known and widely used because magnetic disk devices facilitate fast storage and access of large amounts of information. A typical disk drive is comprised of a magnetic recording medium in the form of a disk for storing information, and a magnetic read/write head for reading or writing information on the disk. The disk rotates on a spindle controlled by a drive motor and the magnetic read/write head is attached to a slider supported above the disk by an actuator arm. When the disk rotates at high speed a cushion of moving air is formed lifting the air bearing surface (ABS) of the magnetic read/write head above the surface of the disk.

As disk drive technology progresses, more data is compressed into smaller areas. Increasing data density is dependent upon read/write heads fabricated with smaller geometries capable of magnetizing or sensing the magnetization of correspondingly smaller areas on the magnetic disk. The advance in magnetic head technology has led to heads fabricated using processes similar to those used in the manufacture of semiconductor devices.

The read portion of the head is typically formed using a magnetoresistive (MR) element. This element is a layered structure with one or more layers of material exhibiting the magnetoresistive effect. The resistance of a magnetoresistive element changes when the element is in the presence of a magnetic field. Data bits are stored on the disk as small magnetized region on the disk. As the disk passes by beneath the surface of the magnetoresistive material in the read head, the resistance of the material changes and this change is sensed by the disk drive control circuitry.

The write portion of a read/write head is typically fabricated using a coil embedded in an insulator between a top and bottom magnetic layer. The magnetic layers are arranged as a magnetic circuit, with pole tips forming a magnetic gap at the air bearing surface of the head. When a data bit is to be written to the disk, the disk drive circuitry sends current through the coil creating a magnetic flux in accordance with Maxwell's equations or Ampere's law. The magnetic layers provide a path for the flux and a magnetic field generated at the pole tips magnetizes a small portion of the magnetic disk, thereby storing a data bit on the disk.

The read/write head is formed by deposition of magnetic, insulating and conductive layers using a variety of techniques. Fabrication of the write head coil requires a metallization step wherein the metallization is formed in the shape of a coil. The damascene process is a technique used for forming metallization layers in integrated circuits. Generally, the damascene process involves forming grooves or trenches in a material, and then electroplating to fill the trenches with metal. After a trench is formed, however, a seed layer must first be deposited in the trench to provide an electrically conductive path for the ensuing electrodeposition process. Metal is then deposited over the entire area so that the trench is completely filled. The damascene process used in semiconductor device fabrication requires fewer process steps compared to other metallization technologies. To achieve optimum adherence of the conductor to the sides of the trench, the seed layer deposited prior to deposition of the metal must be continuous and essentially uniform. However, in a trench with a high aspect ratio, that is, the height of the trench walls is large in comparison to the width, it is difficult to uniformly cover the sidewalls of the trench with the seed layer.

A variety of vacuum techniques have been attempted to achieve the desired seed layer coverage and uniformity for high aspect ratio features, including physical vapor deposition (PVD), ionized physical vapor deposition (IPVD), collimated PVD (CPVD) and chemical vapor deposition (CVD). PVD results in non-uniform coverage, where coverage is thicker on the bottom of the trench and thinner on the sidewalls. This results in poor filling of the metal in the trench. The CVD technique has produced more uniform coverage, however, CVD requires temperatures of up to 300 C. The magnetoresistive element in the read head degrades at high temperatures, therefore the CVD process presents problems when used to manufacture magnetic heads. IPVD and CPVD processes can be tailored to provide uniform coverage. In the absence of such tooling, IBD can be used as an alternative.

It can be seen then that there is a need for a method for uniformly depositing a seed layer into high aspect ratio features formed by the damascene process during the fabrication of a magnetic read/write head.

SUMMARY OF THE INVENTION

To overcome the limitations in the prior art described above, and to overcome other limitations that will become apparent upon reading and understanding the present specification, the present invention discloses a method for fabricating the coil layer in a magnetic read/write head using the damascene process.

The present invention solves the above-described problems by forming coils using ion beam deposition to deposit the seed layer.

A method in accordance with the principles of the present invention includes forming a trench in a substrate, depositing a seed layer in the trench by ion beam deposition and filling the trench with material to form a coil for an inductive write head.

Another embodiment of the present invention includes a magnetoresistive/inductive write head assembly comprising a magnetoresistive read head, an inductive write head with a coil element, the coil element comprising a substrate, a coil shaped trench in the substrate, one or more seed layers deposited in the trench by ion beam deposition and conductive material filling the trench to form a coil.

Another embodiment of the present invention includes a magnetic storage device comprising a magnetic media for storing data, a magnetic read/write head assembly, a motor for translating the position of the magnetic media, an actuator for positioning the magnetic read/write head relative to the magnetic media wherein the magnetic read/write has a coil element comprising a substrate, a coil shaped trench in the substrate, one or more seed layers deposited in the trench by ion beam deposition and conductive material filling the trench to form a coil.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

The present invention provides a method for fabricating the coil of the inductive write portion of a magnetic read/write head. In accordance with the present invention, a coil trench pattern is formed in a substrate using conventional photolithography. The coil trench is etched by reactive ion etching, forming a coil trench with a high aspect ratio wherein the height of the trench is much larger than the width. Seed layers are deposited in the trench by ion beam deposition. Metal is then electroplated over the entire structure forming the metal coil in the formed trenches. Finally, excess metal is removed by chemical mechanical polishing the surface of the substrate and embedded coil.

Figure 1:
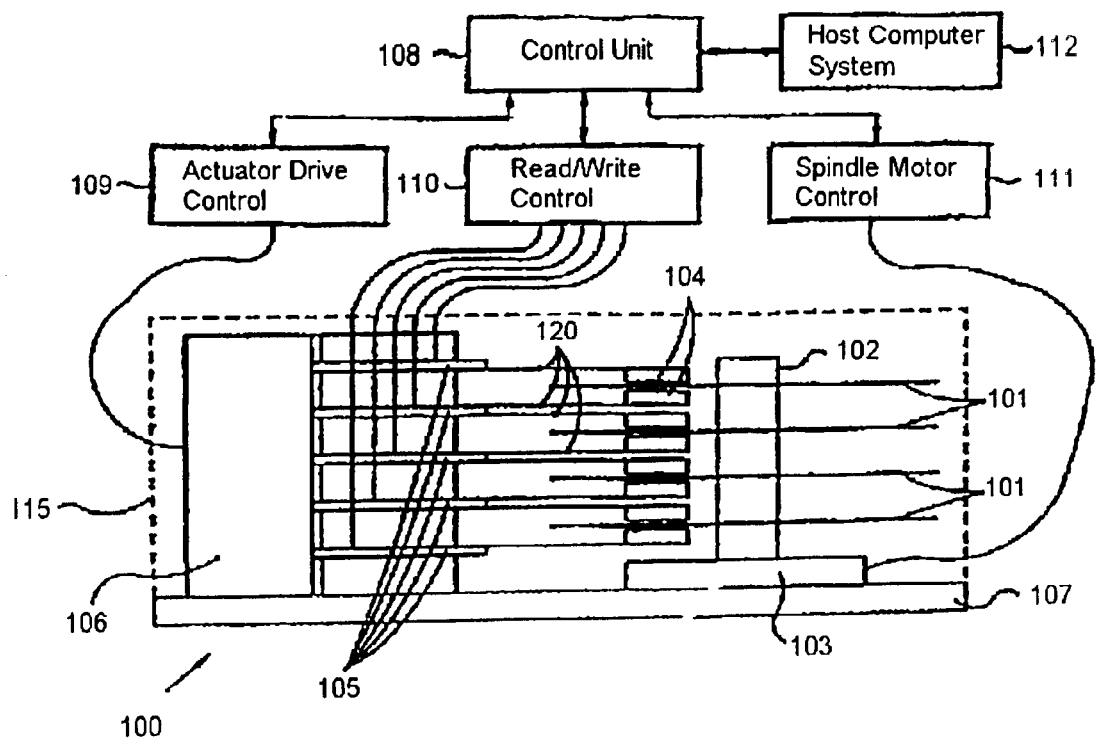
FIG. 1 illustrates a side view of one embodiment of a storage system according to the present invention.

FIG. 1 illustrates a diagram of a disk storage system suitable for practicing the present invention. The system 100 includes a number of magnetic disks 101 which are mounted on a spindle motor shaft 102 coupled to a drive motor 103 attached to the chassis 107. There is a slider 104 with an attached read/write head positioned above each disk 101. Each slider 104 is coupled through a suspension 120 to a corresponding actuator arm 105 connected to the actuator 106. The disk mechanism is enclosed in a housing 115. A control unit 108 provides control functions for the system 100. The control unit 108 controls the operation of the disk drive and typically incorporates a processor, memory and other components. The controller is coupled to the circuitry for actuator drive control 109, the read/write control 110 and the spindle motor control 111. The control unit communicates with the host computer system 112.

Figure 2:
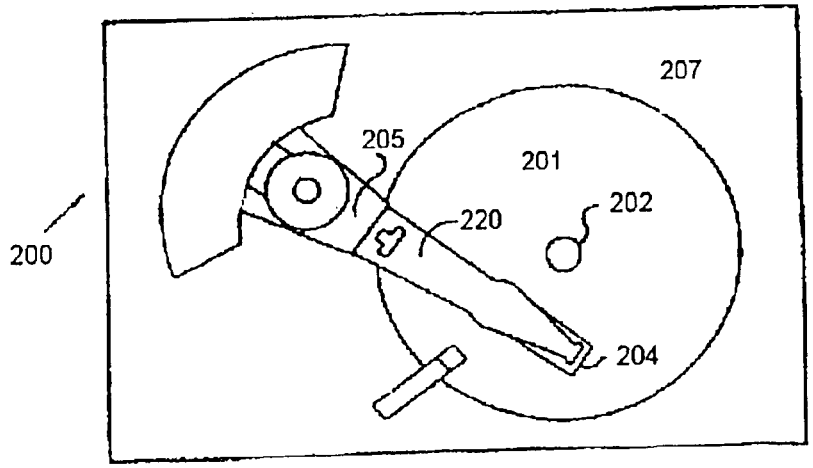
FIG. 2 illustrates a top view of one embodiment of a storage system according to the present invention.

FIG. 2 illustrates a top view of a disk drive system 200. From this perspective, the chassis 207, magnetic disk 201, spindle motor shaft 202, suspension 220, slider 204 with attached read/write head and actuator arm 205 can be seen.

The magnetic disk 101, 201 rotates on a spindle motor shaft 102, 202 controlled by a drive motor 103 and the magnetic read/write head is attached to a slider 104, 204 supported above the disk 101, 201 by an actuator arm 105, 205. When the disk 101, 201 rotates at high speed, a cushion of moving air is formed, lifting the air bearing surface (ABS) of the magnetic read/write head above the surface of the disk.

Figure 3:
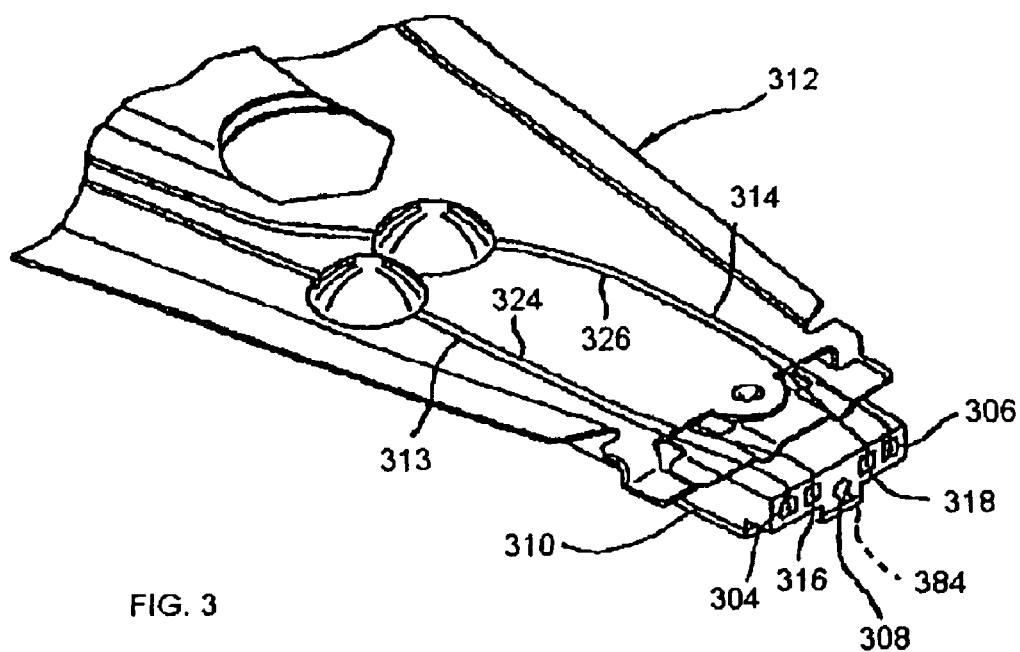
FIG. 3 illustrates a slider mounted on a suspension.

FIG. 3 illustrates a slider 310 mounted on a suspension 312. Two solder connections 304 and 306 connect leads from the MR read sensor 308 to wires 313 and 314 on the suspension 312. Likewise, two solder connections 316 and 318 connect the write coil 384 to wires 324 and 326 on the suspension. The wires 313, 314, 324 and 326 are eventually coupled to the read/write control circuitry 110 and thus to the control unit 108 allowing the control unit to send and receive data from the disks 101, 201.

Figure 4:
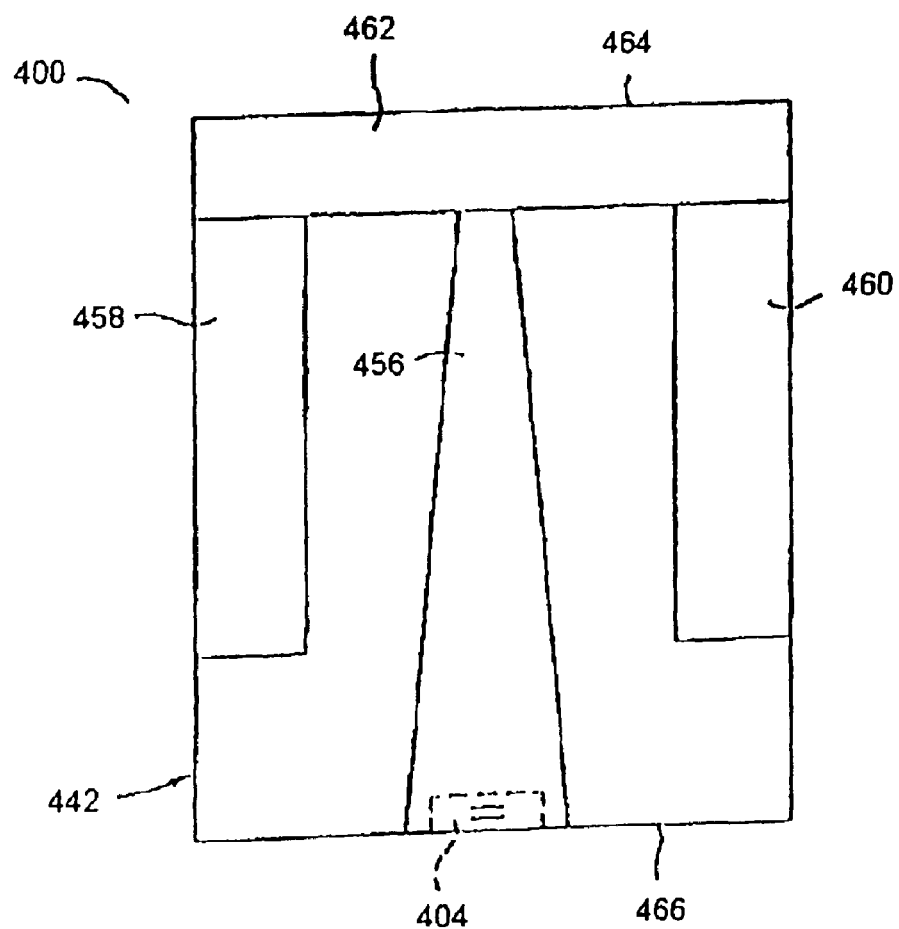
FIG. 4 illustrates an ABS view of a magnetic head.

FIG. 4 illustrates the air bearing surface view of the slider 400 with attached read/write head 404. The slider has a center rail 456 that supports the head 404, and side rails 458 and 460. The rails 456, 458 and 460 extend from a cross rail 462. With respect to the rotation of a magnetic disk, the cross rail 462 is at a leading edge 464 of the slider and the magnetic head 404 is at a trailing edge 466 of the slider.

Figure 5:
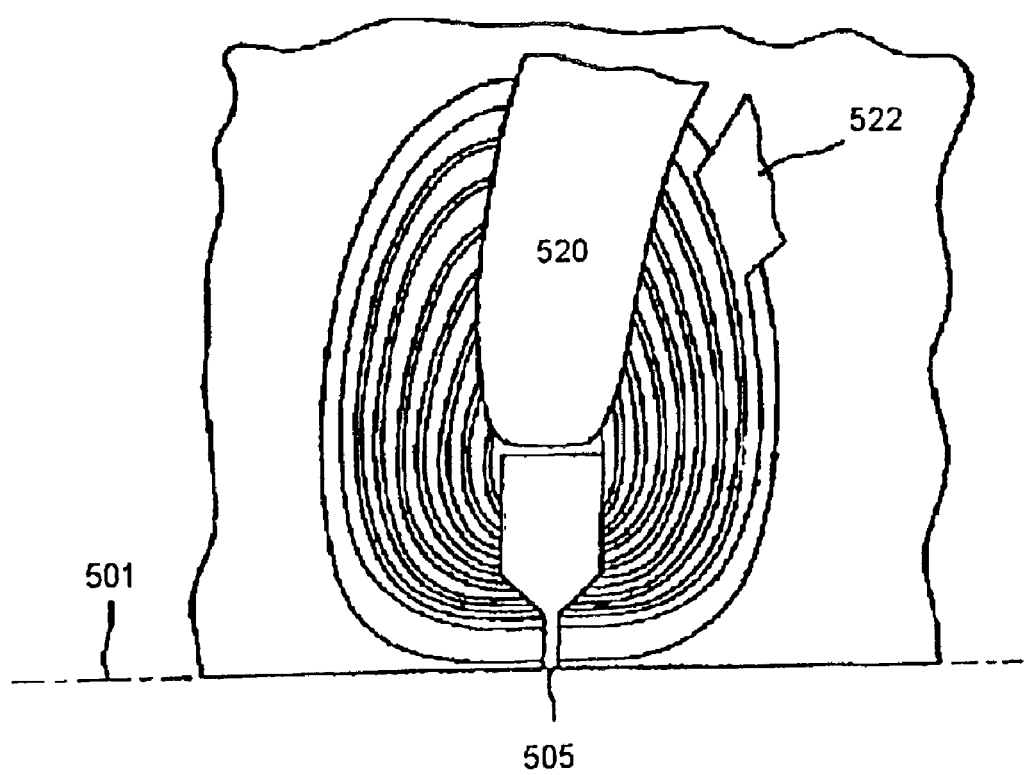
FIG. 5 illustrates a view of a coil element with all the material above the coil layer and leads removed according to the present invention.

FIG. 5 illustrates a coil element of a read/write head with the material above the coil layer removed. The coil leads 520 and 522 are connected via the solder connections 316 and 318 shown in FIG. 3 to wires 324 and 326 on the suspension shown in FIG. 3. The wires 324 and 326 are coupled to the write control circuitry 110 shown in FIG. 1. The coil has a pole tip 505 illustrated in FIG. 5, which is proximate to the air bearing surface 501 of the read/write head.

Figure 6:
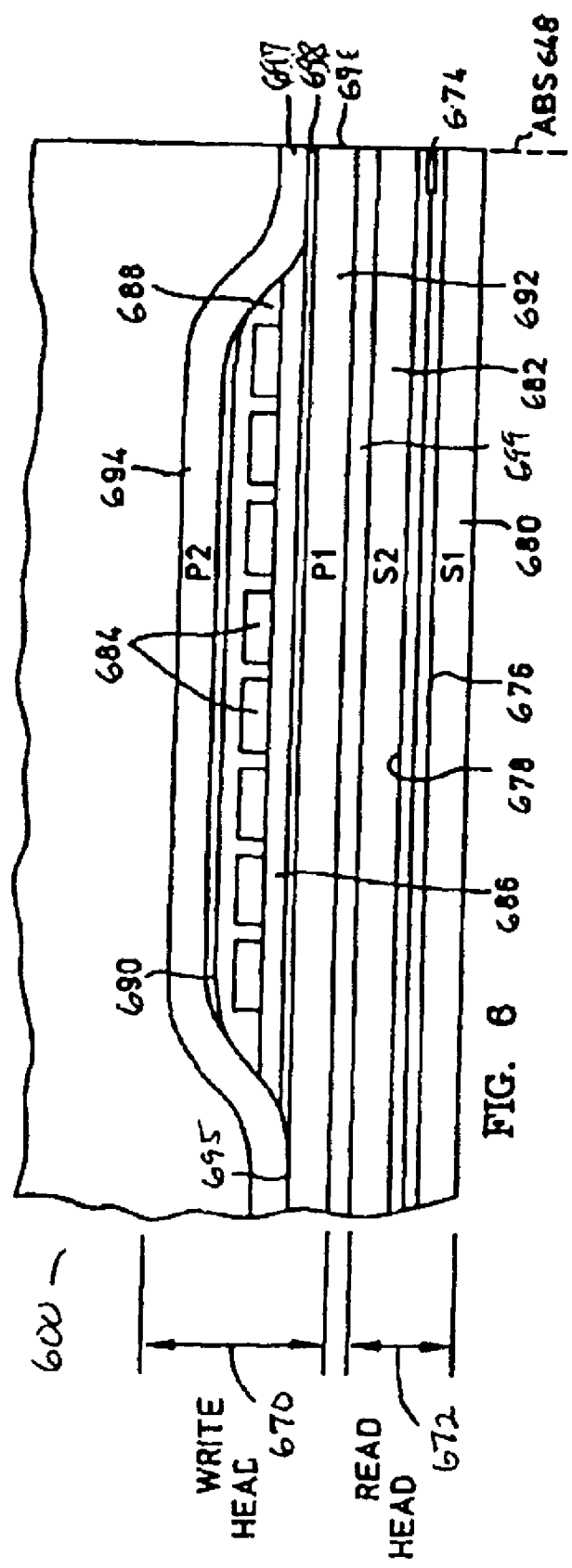
FIG. 6 illustrates a cross sectional view of a piggyback MR read/inductive write head according to the present invention.

FIG. 6 is a side cross-sectional elevation view of a piggyback magnetic head 600. In FIG. 6, the piggyback magnetic head 600 includes a write head portion 670 and a read head portion 672, the read head portion employing a spin valve sensor 674 of the present invention. The read sensor 674 is sandwiched between nonmagnetic electrically insulative first and second read gap layers 676 and 678, and the read gap layers are sandwiched between ferromagnetic first and second shield layers 680 and 682. In response to external magnetic fields, the resistance of the spin valve sensor 674 changes. A sense current conducted through the sensor causes these resistance changes to be manifested as potential changes. These potential changes are then processed as readback signals by processing circuitry, which was represented by Read/Write Control 110 and Control Unit 108 of FIG. 1.

The write head portion 670 of the magnetic head 600 includes a coil layer 684 sandwiched between first and second insulation layers 686 and 688. A third insulation layer 690 may be employed for planarizing the head to eliminate ripples in the second insulation layer caused by the coil layer 684. The first, second and third insulation layers are referred to in the art as an "insulation stack". The coil layer 684 and the first, second and third insulation layers 686, 688 and 690 are sandwiched between first and second pole piece layers 692 and 694. The first and second pole piece layers 692 and 694 are magnetically coupled at a back gap 695 and have first and second pole tips 696 and 697 which are separated by a write gap layer 698 at the ABS. An insulation layer 699 is located between the second shield layer 682 and the first pole piece layer 692. Since the second shield layer 682 and the first pole piece layer 692 are separate layers this head is known as a piggyback head.

Formation of a coil element using the damascene technique involves forming a trench with high aspect ratio, typically 5:1, in the substrate. A thin layer of material, typicaly one hundred to several thousand angstroms thick, called a seed layer is then deposited in the trench. A seed layer may be comprised of more than one thin film layer, typically the first layer is a barrier layer. The purpose of the barrier layer is two-fold. First, the barrier layer forms an adhesion layer promoting adhesion of the metal in the trench. Second, the barrier layer provides a diffusion barrier keeping the metal in the trench from diffusing into the substrate, causing degradation of the device. Additional adhesion seed layers may be deposited. It is important that the seed layers uniformly cover the walls and bottom of the trench. If the seed layer is too thin, adhesion of the metal is poor and voids form in the metal. However, if the seed layer is too thick, it constricts the area for the metal fill resulting in a smaller metallic cross sectional area and increased voltage drop when current is applied to the coil.

In prior art inventions, the barrier layer has been deposited by a variety of techniques, including physical vapor deposition (PVD), ionized physical vapor deposition (IPVD) and chemical vapor deposition (CVD). PVD deposition of seed layer material results in non-uniform coverage resulting in poor filling of the metal in the trench. The CVD technique has produced more uniform coverage, however, CVD requires temperatures of up to 300 C, which may degrade the magnetoresistive element of the head.

In accordance with the present invention, seed layers of a trench for forming a coil for an inductive write head are deposited using ion beam deposition. Ion beam deposition provides a highly directional deposition of the material. Therefore, uniform seed layers may be uniformly deposited by this method by tailoring deposition angle(s) and ion energy without exposing the magnetoresistive read element to detrimentally high temperatures.

FIGS. 7–10 are cross sectional views diagrammatically illustrating the method of forming the coil element of an inductive write head in accordance with the principles of the present invention.

Figure 7:
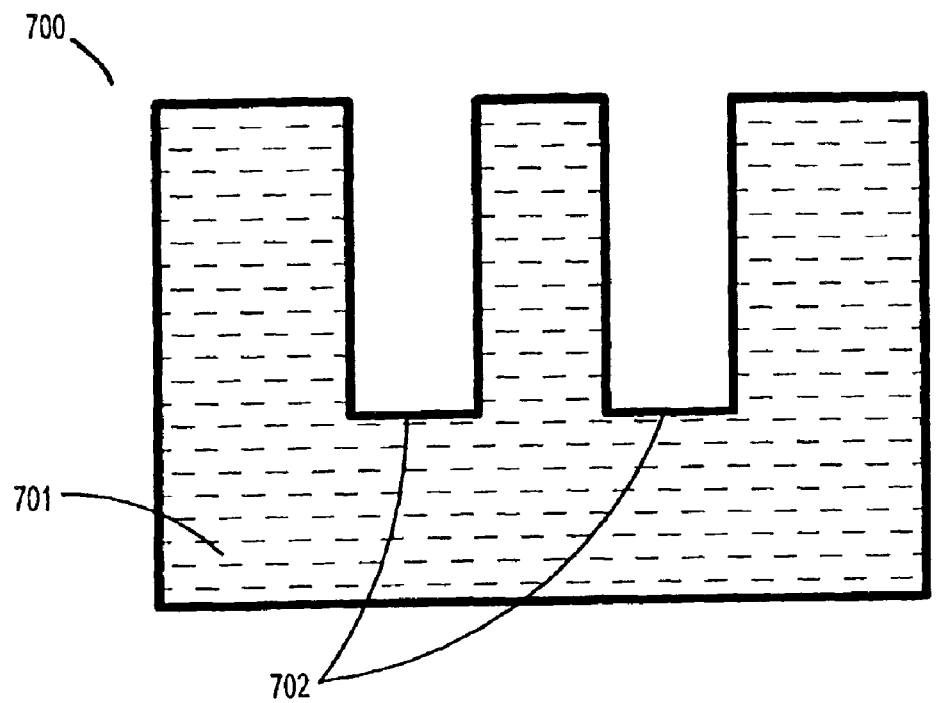
FIG. 7 illustrates fabrication of a coil element following formation of coil trenches according to the present invention.

FIG. 7 illustrates a cross section view 700 of a insulating layer 701 for fabrication of a coil element following coil trenches according to the present invention. As shown in FIG. 7, the coil is formed on an insulating layer 701. The areas for trench formation are defined by standard photolithographic techniques (not shown). After the areas for trench formation are defined, the unprotected areas of the substrate are etched by reactive ion etching resulting in the formation of trenches 702. Although the diagrams of FIGS. 7–10 shows only two trenches, one skilled in the art would realize that any number of trenches may be formed by this process.

Figure 8:
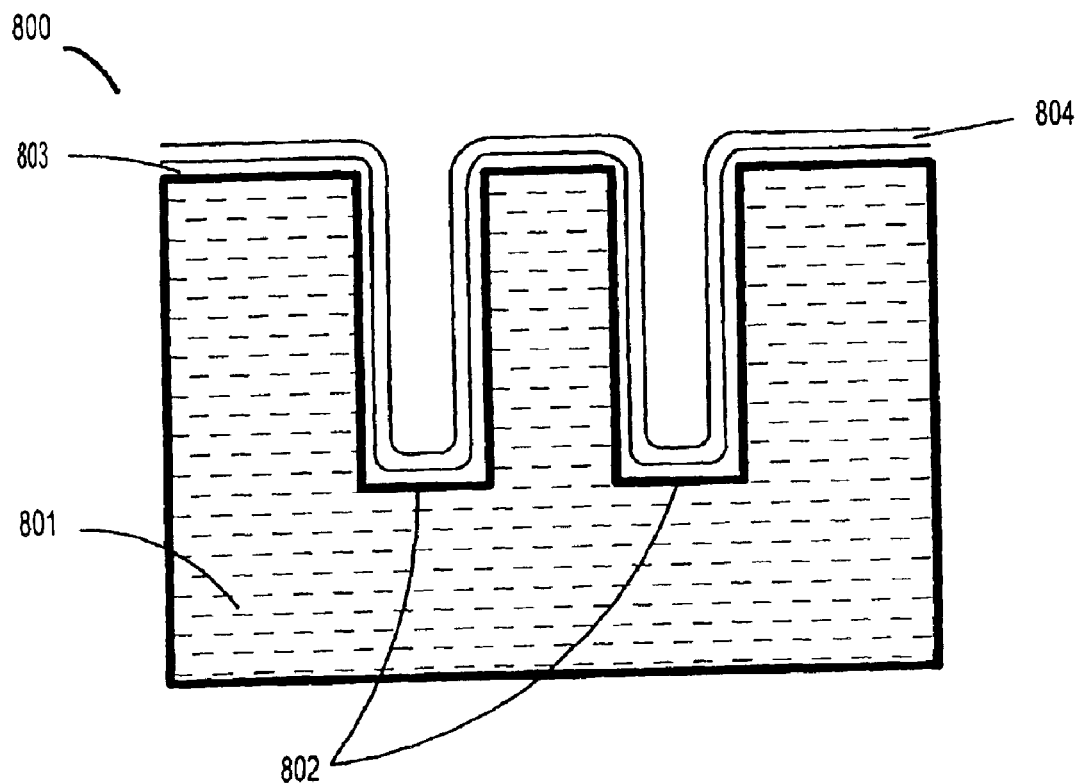
FIG. 8 illustrates a cross sectional view of fabrication of a coil element following deposition of a first and second seed layer according to the present invention.

FIG. 8 illustrates a cross sectional view 800 of fabrication of a coil element following deposition of a first and second seed layer according to the present invention. FIG. 8 shows an exemplary embodiment of the invention after deposition of the seed layers including the insulating layer 801, and one or more seed layers 803, 804 formed using ion beam deposition. Trenches 802 have been formed in the substrate 801 by using a combination of photolithography to define the trench areas, and reactive ion etching to form the trenches. Following the trench formation, two seed layers 803, 804 are deposited by ion beam deposition. The first seed layer 803 is formed by depositing a layer of Ta (e.g., 200 Å) into the trenches 802. The second seed layer 804 is formed by depositing a layer of Cu (e.g., 1000 Å) into the trench. Both seed layers are deposited using ion beam deposition with the ion beam being adjusted. Although the trenches 802 shown diagrammatically in FIG. 8 have relatively low aspect ratios, it is understood by those skilled in the art that these diagrams are used for heuristic purposes only and that seed layers may be formed by this technique in trenches with higher aspect ratios. The seed layer deposition results in seed layer material in the trenches as well as across the surface of the substrate.

Figure 9:
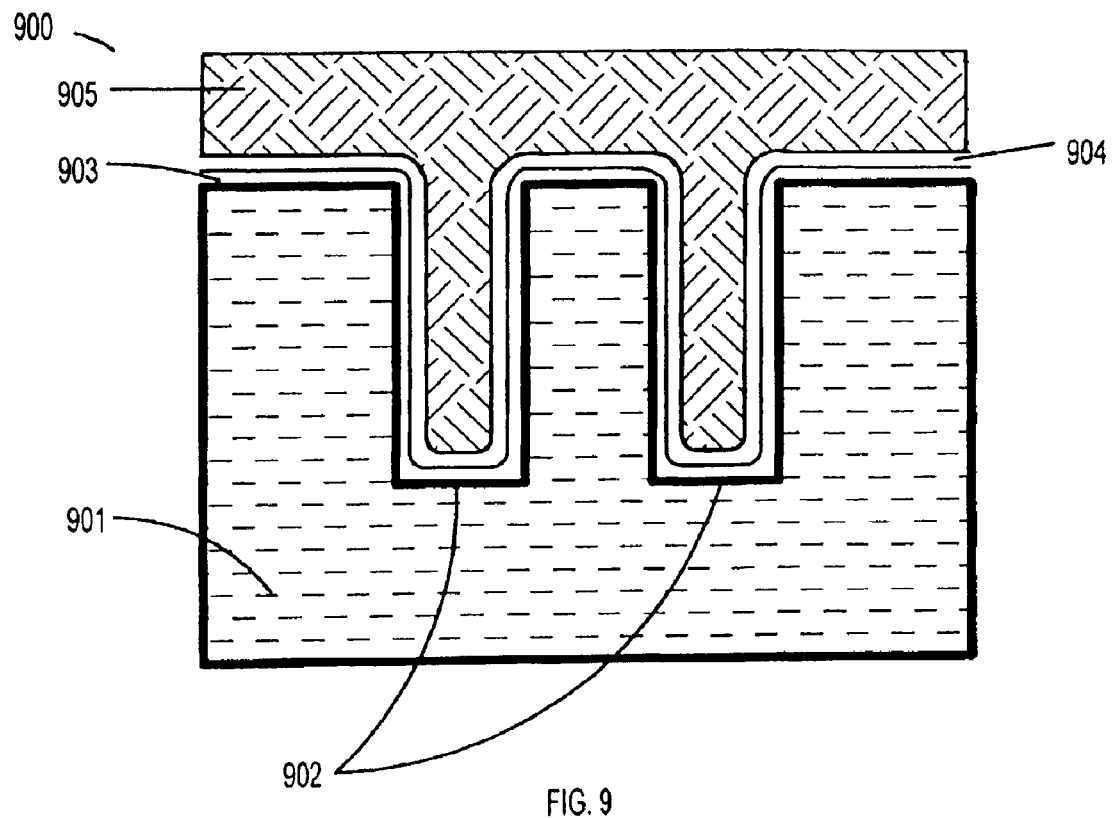
FIG. 9 illustrates a cross sectional view of fabrication of a coil element following electroplating the substrate with metal according to the present invention.

After the seed layers are formed, a conductor is deposited on the substrate by electroplating. FIG. 9 illustrates the structure 900 following the electroplating process. FIG. 9 shows the insulating layer 901, trenches 902 in the insulating layer 901, and seed layers 903, 904 formed in accordance with the methods set forth in the above paragraphs. The electroplated conductor 905 fills the trenches 902 and covers the surface of the substrate 901. In the exemplary embodiment of the invention, the conductor used for the electroplating process is Cu. After the electroplating step is complete, the surface of the substrate is covered with the seed layers 902, 903, as well as a layer of the conducting material 905. These layers must be removed so that the individual coil sections are electrically insulated from each other. Removal of the excess material is accomplished by chemical mechanical polishing the surface of the substrate 901.

Figure 10:
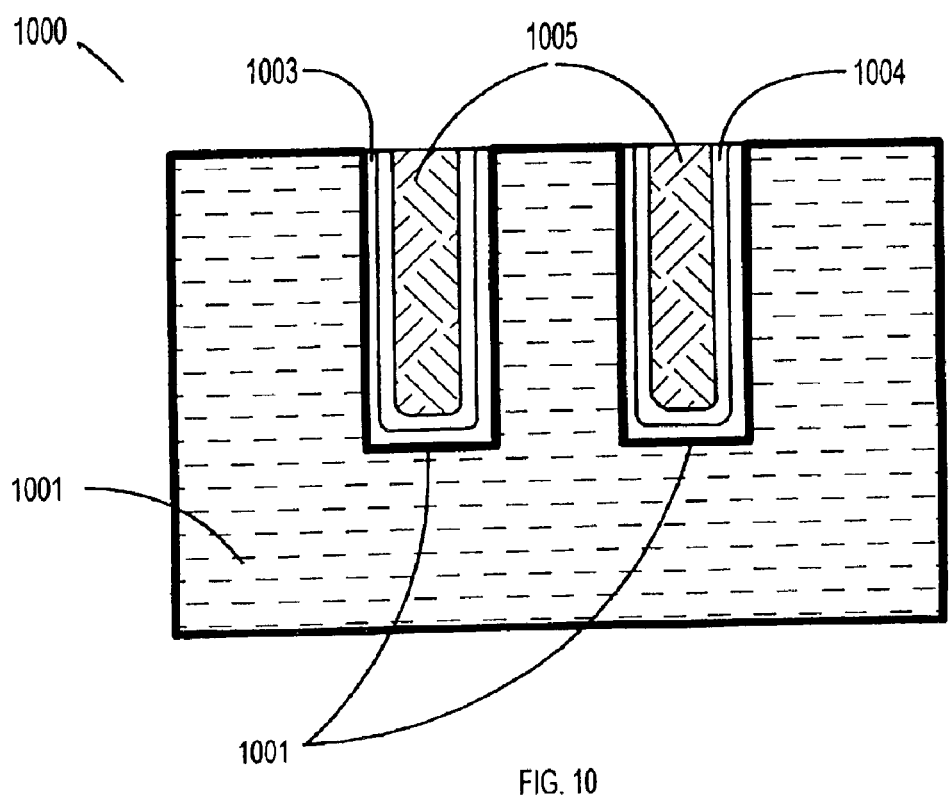
FIG. 10 illustrates a cross sectional view of fabrication of a coil element following chemical mechanical polishing.

FIG. 10 is a cross sectional view 1000 illustrating the coil element after the chemical mechanical polishing step is complete. Seed layers 1003, 1004, deposited by ion beam deposition, are shown in the trenches 1002, but the seed layer material has been polished away from the surface of the insulating layer 1001. Likewise, the electroplated conductor 1005 is deposited within the trenches 1002, but has been polished away from the surface of the insulating layer 1001. FIG. 10 diagrammatically illustrates the completed coil element following the step of chemical mechanical polishing. Chemical mechanical polishing the surface creates the individual turns of the coil embedded within the dielectric and planarizes the coil.

Figure 11:
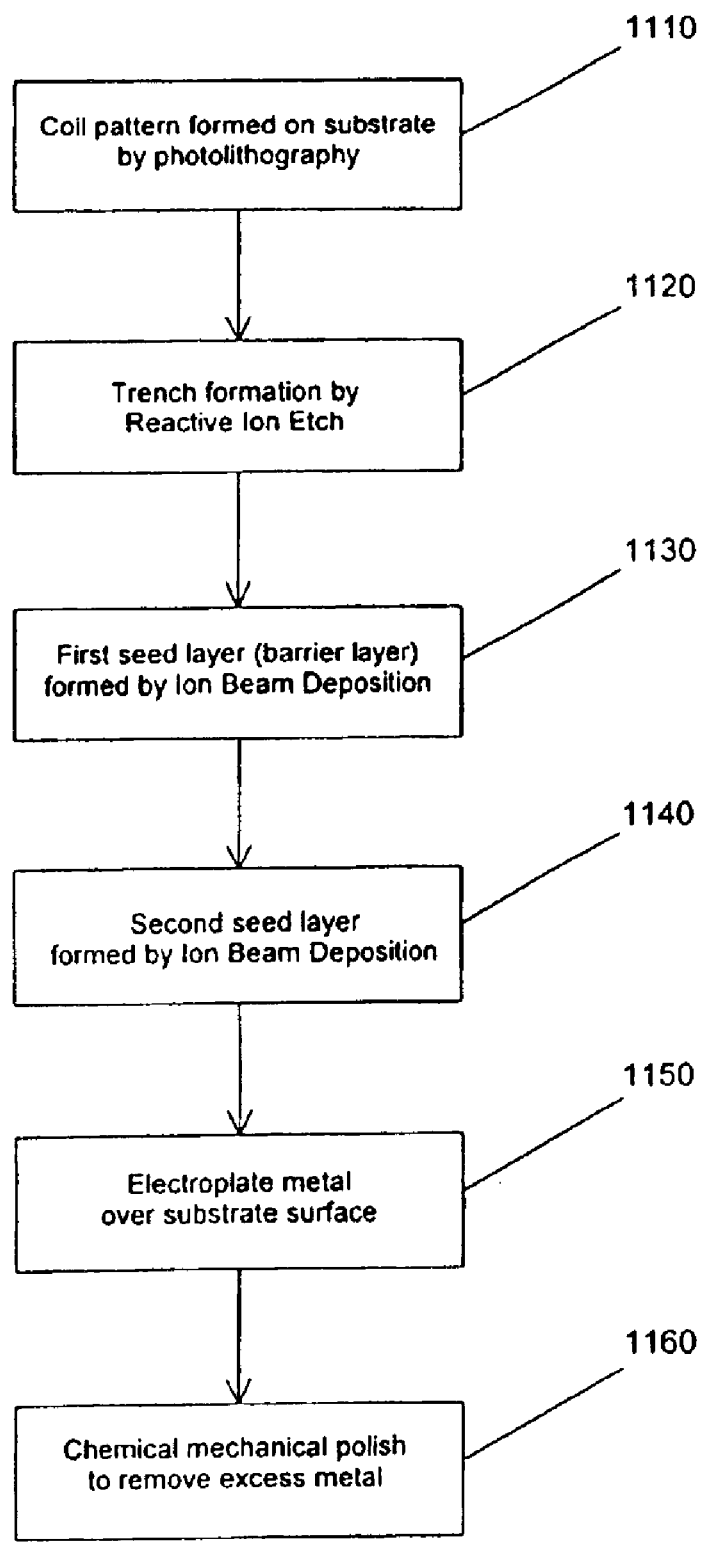
FIG. 11 is a flowchart of the steps for fabrication of a coil element according to the present invention.

FIG. 11 is a flowchart of the process of fabricating a coil element in accordance with the present invention. The coil is patterned on the substrate using photolithography 1110. The substrate is etched by reactive ion etching to form the coil shaped trench in the substrate 1120. The first seed layer (barrier layer) is formed by ion beam deposition 1130. The second seed layer is formed by ion beam deposition 1140. A conductor is electroplated over the surface of the substrate 1150 and the structure is chemical mechanical polished to remove excess metal 1160.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for forming a coil for an inductive write head, comprising:

forming a trench in a substrate;

depositing a seed layer in the trench by ion beam deposition; and filling the trench with a material to form a coil for an inductive write head.

2. A method as claimed in claim 1, wherein the trench is filled with copper.

3. A method as claimed in claim 1, wherein the seed layer is formed of a layer of a first material and a layer of a second material.

4. A method as claimed in claim 3, wherein the first material is tantalum and the second material is copper.

5. A method as claimed in claim 4, wherein the first layer has a thickness of approximately 200 Å and the second layer has a thickness of approximately 1000 Å.

6. A method as claimed in claim 1, wherein the ion beam used to deposit the layer of material is adjusted to 20 degrees off normal.

7. A method as claimed in claim 1, wherein the trench has an aspect ratio of about 5:1.

8. A method as claimed in claim 1, wherein a pattern of the coil is formed on the substrate by photolithography and the trench is etched by reactive ion etching.

9. A method as claimed in claim 1, wherein the substrate is chemical mechanical polished after filling the trench with material.

* * * * *